(12) United States Patent
Sardesai et al.

(10) Patent No.: US 8,233,400 B2
(45) Date of Patent: Jul. 31, 2012

(54) METHODS, SYSTEMS, AND COMPUTER READABLE MEDIA FOR VERIFYING THE AVAILABILITY OF AN INTERNET PROTOCOL (IP) MEDIA ROUTER DURING A CALL SETUP

(75) Inventors: Ashish Sardesai, Rockville, MD (US); Srikant Chandrasekhar, Gaithersburg, MD (US); Honnappa Nagarahalli, Austin, TX (US)

(73) Assignee: Genband US LLC, Plano, TX (US)

( * ) Notice: Subject to any disclaimer, the term of this patent is extended or adjusted under 35 U.S.C. 154(b) by 301 days.

(21) Appl. No.: 12/554,841

(22) Filed: Sep. 4, 2009

(65) Prior Publication Data

US 2011/0058544 A1    Mar. 10, 2011

(51) Int. Cl.
*H04L 12/26* (2006.01)
*H04L 12/66* (2006.01)
*H04L 12/28* (2006.01)

(52) U.S. Cl. ......................... 370/248; 370/356; 370/389

(58) Field of Classification Search ........................ None
See application file for complete search history.

(56) References Cited

U.S. PATENT DOCUMENTS

| | | | | |
|---|---|---|---|---|
| 5,996,021 | A * | 11/1999 | Civanlar et al. | 709/238 |
| 2004/0208185 | A1 * | 10/2004 | Goodman et al. | 370/401 |
| 2006/0209852 | A1 * | 9/2006 | Wakumoto et al. | 370/401 |
| 2007/0036151 | A1 | 2/2007 | Baeder | |
| 2007/0076710 | A1 * | 4/2007 | Khan | 370/389 |
| 2008/0070543 | A1 * | 3/2008 | Matuszewski et al. | 455/404.1 |
| 2008/0084877 | A1 | 4/2008 | Brzozowski | |
| 2008/0181211 | A1 | 7/2008 | Parolkar et al. | |
| 2009/0019536 | A1 * | 1/2009 | Green et al. | 726/12 |
| 2009/0086728 | A1 * | 4/2009 | Gulati et al. | 370/389 |
| 2009/0168787 | A1 * | 7/2009 | Ansari et al. | 370/401 |
| 2010/0077067 | A1 * | 3/2010 | Strole | 709/223 |
| 2011/0026516 | A1 * | 2/2011 | Roberts et al. | 370/352 |

OTHER PUBLICATIONS

Notification of Transmittal of the International Search Report and the Written Opinion of the International Searching Authority, or the Declaration for PCT/US2010/047946 (Apr. 29, 2011).

* cited by examiner

*Primary Examiner* — Melanie Jagannathan
(74) *Attorney, Agent, or Firm* — Jenkins, Wilson, Taylor & Hunt, P.A.

(57) ABSTRACT

Methods, systems, and computer readable media for verifying the availability of an IP media router during a call setup are described. In one embodiment, the method comprises receiving, from a first endpoint device, a call setup signaling message requesting to establish a call session with a second endpoint device. The method also includes selecting a first media router to establish a first call leg of the call session, performing a route query and MAC address resolution to determine if the first media router is available, and if the first media router is determined to be available, creating a first redirect stream to communicate media packets received from the second endpoint device to the first endpoint device via the first call leg.

20 Claims, 4 Drawing Sheets

METHODS, SYSTEMS, AND COMPUTER READABLE MEDIA FOR VERIFYING THE AVAILABILITY OF AN INTERNET PROTOCOL (IP) MEDIA ROUTER DURING A CALL SETUP

TECHNICAL FIELD

The subject matter described herein relates to media routing and determining availability of Internet protocol (IP) hop devices prior to establishing a call. More specifically, the subject matter relates to methods, systems, and computer readable media for verifying the availability of an IP media router during a call setup.

BACKGROUND

Typically, when a calling endpoint device desires to establish a call session with an endpoint device of a called party, the calling endpoint device goes off-hook and a call setup signaling message is generated at a local end office (e.g., an SSP). In some packet-based telephony networks, the call setup signaling message is directed toward the called endpoint device and is intercepted by a session border controller (SBC). After receiving the call setup message, the SBC generates a second call setup message (i.e., a second call leg) that is directed toward the called endpoint device. Thus, the SBC is acting as a back-to-back user agent by establishing and coordinating separate call signaling legs. Once the call signaling process is completed, the SBC then establishes the media path for communicating the media traffic between the two endpoint devices. This process usually involves identifying and assigning media routers positioned between the SBC and each endpoint that can handle the media packets. In some instances, the SBC accomplishes this task by performing a route lookup and media access control (MAC) address resolution for one or more media routers.

At present, the route lookup and the MAC address resolution are performed after the packets are received by SBC on a redirect stream and after the call signaling stage is completed. However, performing the route lookup and MAC address resolution after call signaling process is completed can lead to some problems, such as the call session not having any audio if the route lookup/MAC address resolution fails. The problem may also persist if the original caller repeatedly attempts to make calls to the same failed destination. Since the call was successfully established in the signaling stage, the end office that sent the call to the SBC is effectively prevented from searching for another provider that can provide successful media routing since the end office does not detect any call setup problems.

Accordingly, a need exists for improved methods, systems, and computer readable media for verifying the availability of an IP media router during a call setup.

SUMMARY

Methods, systems, and computer readable media for verifying the availability of an IP media router during a call setup are described. In one embodiment, the method comprises receiving, from a first endpoint device, a call setup signaling message requesting to establish a call session with a second endpoint device. The method also includes selecting a first media router to establish a first call leg of the call session, performing a route query and MAC address resolution to determine if the first media router is available, and if the first media router is determined to be available, creating a first redirect stream to communicate media packets received from the second endpoint device to the first endpoint device via the first call leg.

The subject matter described herein for verifying the availability of an IP media router may be implemented using a computer readable medium having stored thereon executable instructions that when executed by the processor of a computer control the computer to perform steps. Exemplary computer readable media suitable for implementing the subject matter described herein includes disk memory devices, chip memory devices, programmable logic devices, and application specific integrated circuits. In one implementation, the computer readable medium may include a memory accessible by a processor. The memory may include instructions executable by the processor for implementing any of the methods for verifying the availability of an IP media router described herein. In addition, a computer readable medium that implements the subject matter described herein may be located on a single device or computing platform or may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
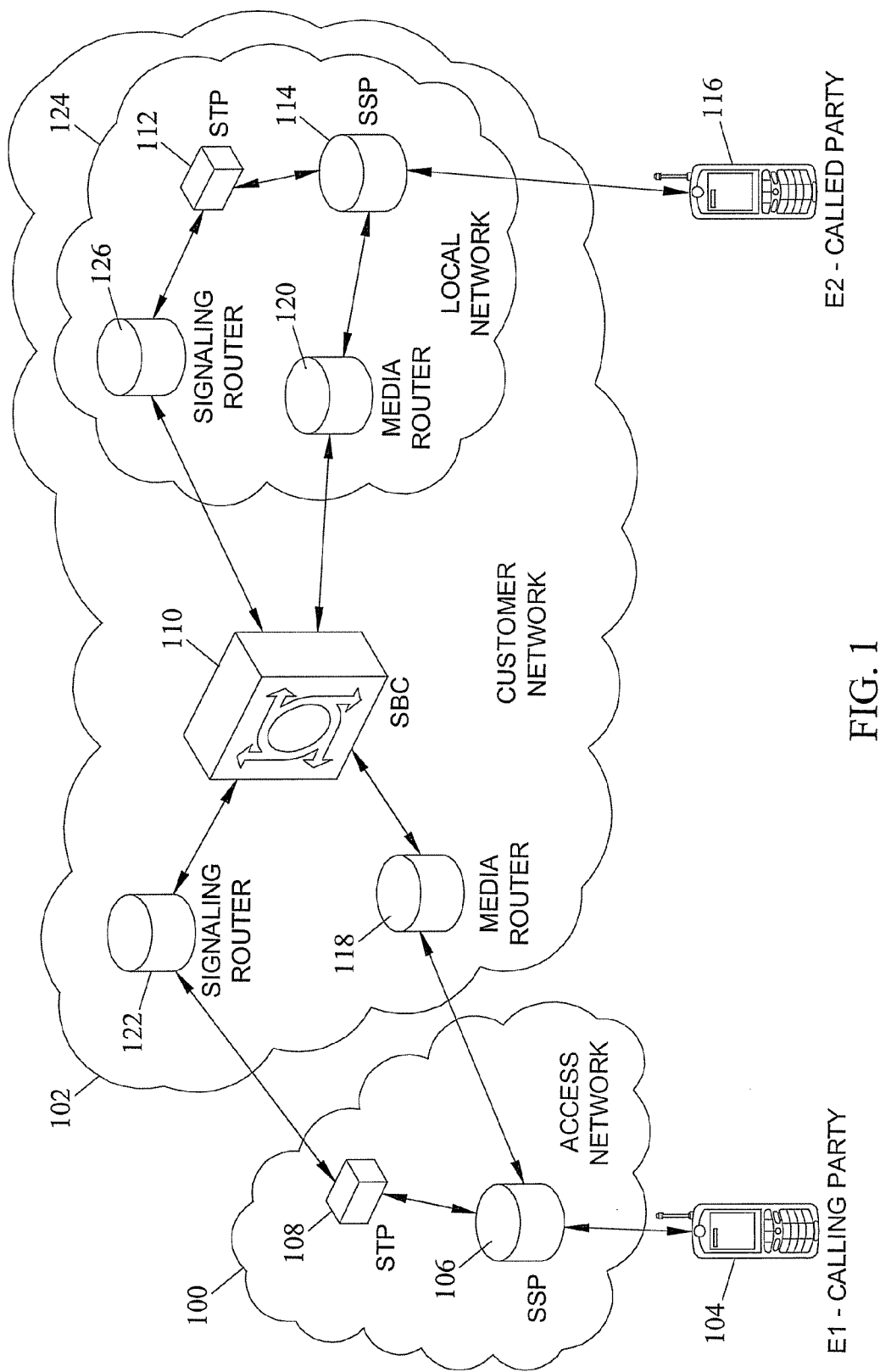
FIG. 1 is a system diagram for verifying the availability of an IP media router in accordance with one embodiment of the subject matter described herein.

FIG. 1 depicts a diagram of an exemplary telephony system that comprises a plurality of networks (e.g., access network 100, customer network 102, and local network 124) that may be utilized to establish a packet-based call. Although FIG. 1 and the following disclosure describes the system establishing a voice over Internet protocol (VoIP) call using session initiation protocol (SIP) signaling messages and IP-based media connections, any other like signaling or media protocols may be used without departing from the scope of the present subject matter.

In one embodiment, access network 100 includes an endpoint device 104, a service switching point (SSP) 106, and a signal transfer point (STP) 108. Similarly, customer network 102 includes a media router 118, a signaling router 122, a session border controller (SBC) 110, and a local network 124. Local network 124 comprises an endpoint device 116, an SSP 114, an STP 112, a media router 120, and a signaling router 126. Although only two endpoint devices, two SSPs, two STPs, two media routers, two signaling routers, and one SBC are shown in FIG. 1, additional and/or similar network elements may be utilized without departing from the scope of the present subject matter.

From a hardware perspective, networks 100, 102, and 124 include a plurality of SS7 nodes, such as STPs and SSPs, which are interconnected using signaling links, also referred to as SS7 links. An SSP is normally installed in Class 4 tandem or Class 5 end office. The SSP is capable of handling both in-band signaling and SS7 signaling (e.g., call setup messages). An STP transfers signaling messages from one signaling link to another. STPs are packet switches and are generally installed as mated pairs for redundancy and backup purposes. Generally, signaling links are transmission facilities used to connect SSPs and STPs together. Conventional signaling links are dedicated bidirectional facilities operating at 56 kbps and at 64 kbps when clear channel capability is deployed. Normally, every signaling link has a mate for redundancy and enhanced network integrity.

As mentioned above, network 102 and 124 comprise media routers 118 and 120, which may include any network element that is configured to route and forward voice or media information. Notably, media routers 118 and 120 are configured to handle media packet communications traversing networks 100, 102, and 124. Similarly, signaling routers 122 and 126 may include any network elements, such as SIP signaling routers, which are configured to handle call signaling messages traversing networks 100, 102, and 124. Signaling routers (e.g., SIP signaling routers) are typically located at centralized points in the network and route all call signaling messages within and between networks. Signaling routers are capable of routing call signaling messages of various telephony protocols. For example, signaling routers may include SIP functionality for routing SIP messages to and from SIP clients, H.323 functionality for routing H.323 messages to and from H.323 clients, and SS7 functionality for routing to and from SS7 clients.

In one embodiment, SBC 110 is configured to establish, control, and/or monitor call sessions (e.g., session control signaling) and/or media signaling between endpoints 104 and 116 (e.g., cellular phones, IP phones, etc.). Each of networks 100, 102, and 124 can be a wireless or wired network configured to transmit data or media content such as voice content and/or video content. For example, portions of the networks can be used to establish session over Internet protocol (SoIP) sessions such as voice over Internet protocol (VoIP) sessions or media over Internet protocol (MoIP) sessions. SBC 110 can be, for example, a multi-protocol session exchange device configured to use more than one session control protocol, such as session initiation protocol (SIP). In one embodiment, SBC 110 may act as a proxy or back to back user agent that sets up a dedicated call leg with each of endpoint device 104 and endpoint device 116.

Figure 2:
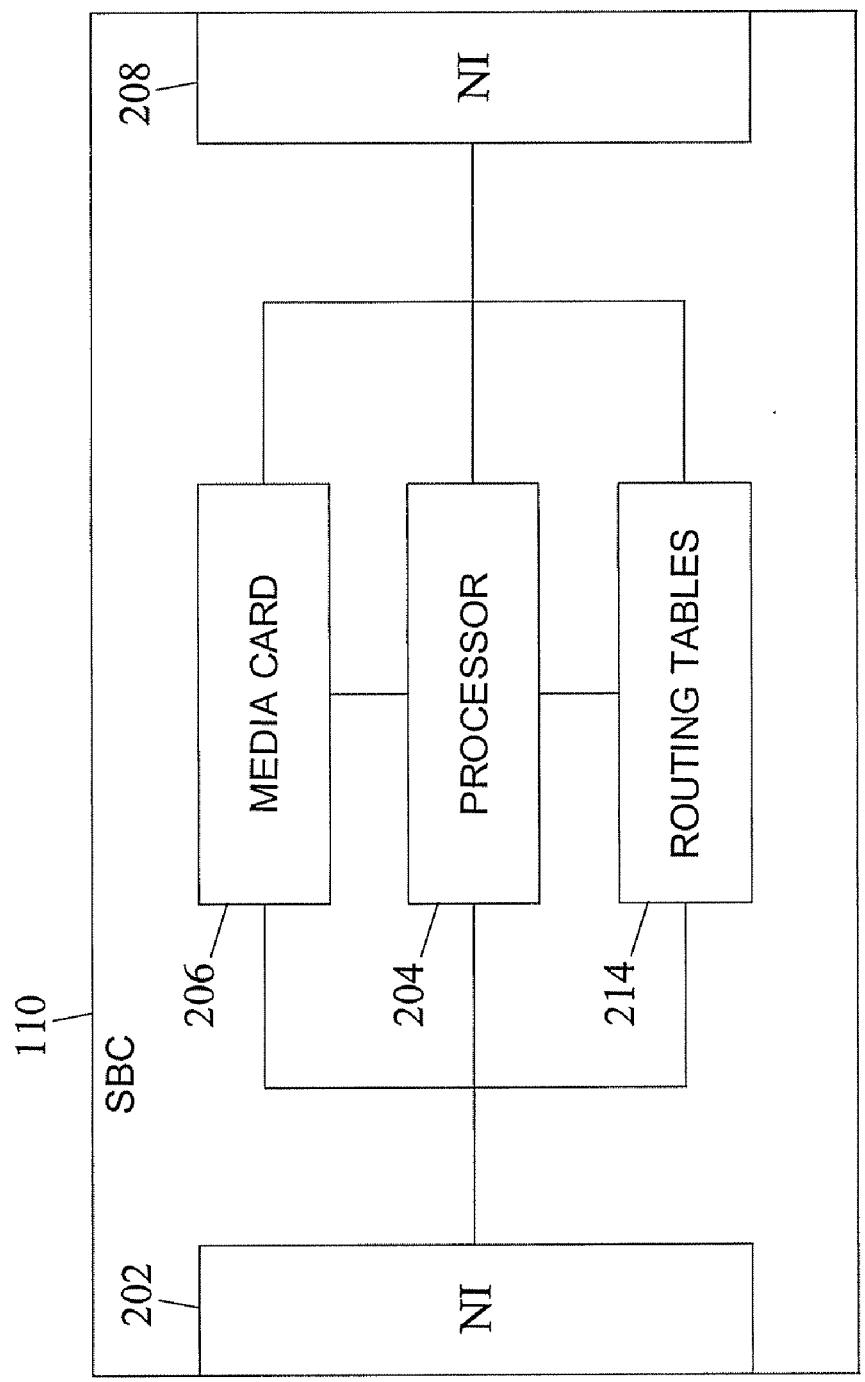
FIG. 2 is a block diagram of an exemplary session border controller (SBC) for verifying the availability of an IP media router in accordance with one embodiment of the subject matter described herein.

FIG. 2 is a block diagram of an exemplary SBC in accordance with one embodiment of the subject matter described herein. Specifically, FIG. 2 depicts SBC 110 comprising network interfaces (NI) 202 and 208, a processor 204, a media card 206, and a routing table database 214. In one embodiment, SBC 110 receives communications from signaling routers and media routers via NI 202 and NI 208. For example, NI 202 may include, at least in part, a port that has been assigned a session-based IP address by media card 206 for the purposes of creating a redirect stream. Data communications received at NI 202 and 208 are typically directed to processor 204 and/or media card 206. For example, NI 202 and 208 may be the components of SBC 110 that are responsible for receiving call setup signaling messages and response messages originated from endpoint devices 104 and 116. In one embodiment, processor 204 may include any central processing unit, such as a microcontroller, that is configured to handle the internal processing functions of SBC 110. Processor 204 may also be used as signaling message processor (but is not limited to that functionality), and may be used in conjunction with media card 206, which may include any conventional media processing module, such as a PCI card, that is capable of establishing call legs of a call session between a calling party and called party. Notably, media card 206 may include any type of media processor or media processing unit configured to establish media sessions between call parties. For instance, processor 204 may instruct media card 206 to perform a route query and media access control (MAC) address resolution for a selected media router for each call leg of the call session. Media card 206 may also be responsible for receiving requests from SBC 110 (e.g., signaling plane) to establish redirect streams (explained below) within SBC 110 after a media router for carrying media communications is identified and verified as being available and/or active. In one embodiment, media card 206 may determine that a media router is available to carry media packets by conducting the aforementioned route query and MAC address resolution. In one embodiment, a media router is available if the media router is online, operational, active, or the like.

As explained in the description of FIG. 3 below, media card 206 performs a route MAC address resolution before the completion of the call setup message and/or before establishing a redirect stream. Consequently, the present subject matter ensures the media connection will be available before the call signaling stage is completed and thereby eliminates the problem of failed audio in established calls.

Figure 3:
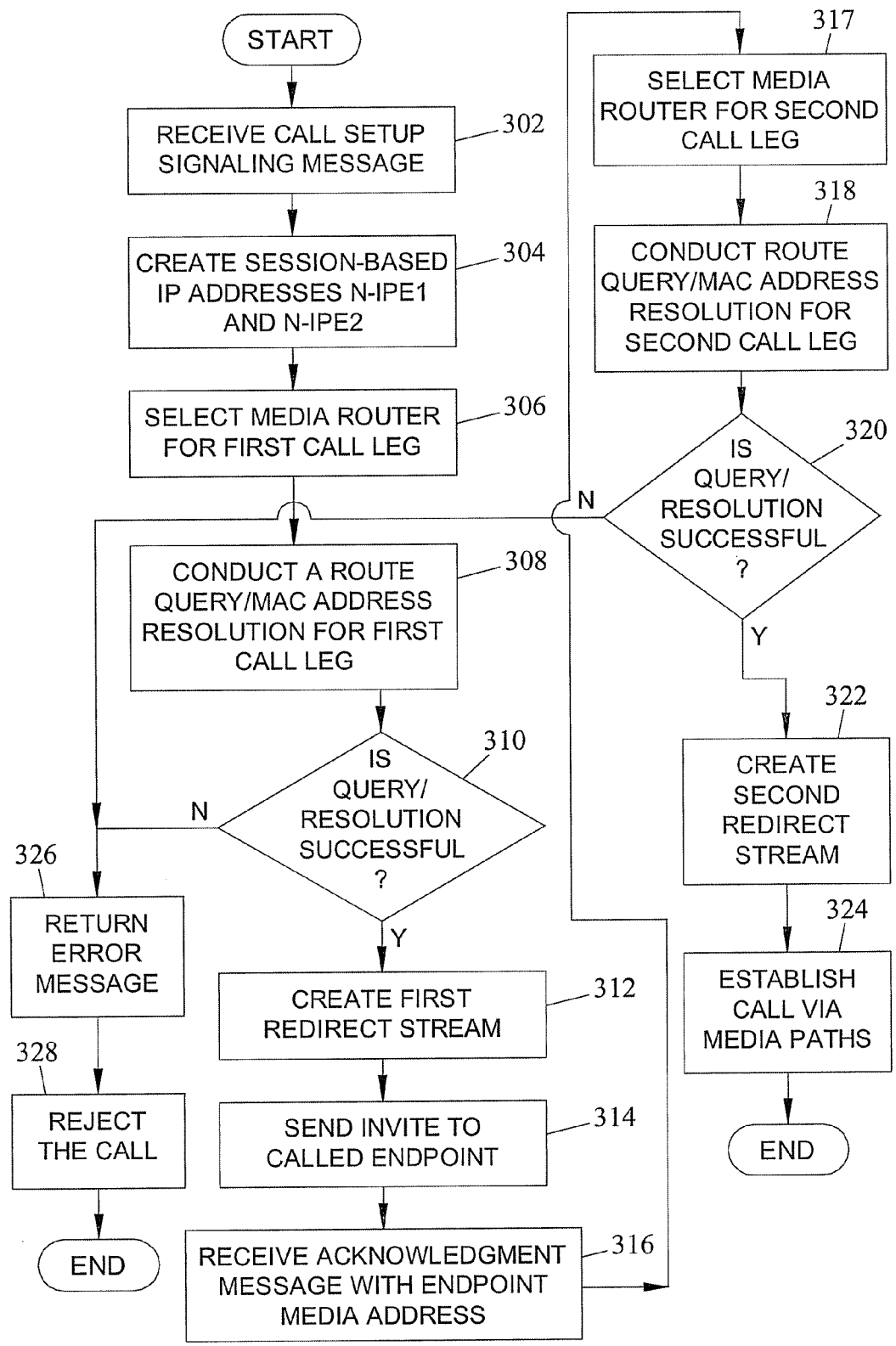
FIG. 3 is an exemplary flow diagram for verifying the availability of an IP media router in accordance with one embodiment of the subject matter described herein.

To better illustrate the communication of the components depicted in FIG. 1, FIG. 3 is provided to illustrate an exemplary method 300 for verifying the availability of a media router according to an embodiment of the subject matter described herein. Similarly, FIG. 4, which depicts a call flow diagram depicting the signaling messages communicated in method 300, will also be referenced in cooperation with FIG. 3 below.

Figure 4:
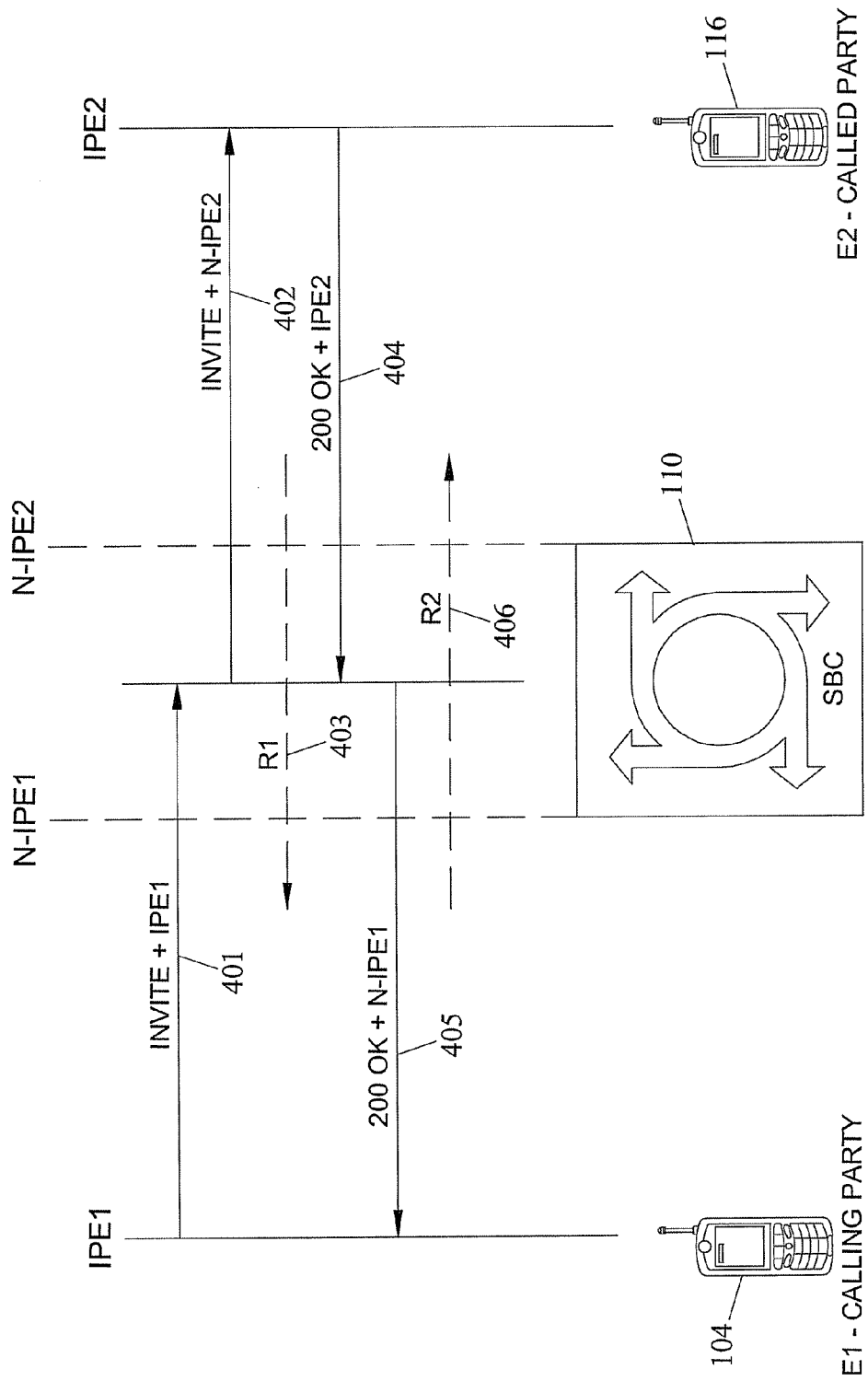
FIG. 4 is an exemplary signaling flow diagram illustrating signals used to establish a call session in accordance with one embodiment of the subject matter described herein.

In block 302, a call setup signaling message is received. In one embodiment, endpoint device 104 sends a call initiation signal to SSP 106 (as a request to communicate with endpoint device 116), and in response, SSP 106 generates a call setup message that is received by the network interface of SBC 110 (via STP 108 and signaling router 122). In one embodiment, the call setup message includes a session initiation protocol (SIP) INVITE message that contains a calling party address and a media Internet protocol (IP) address. The calling party address may include the phone number of endpoint device 104 in which signaling messages from SBC 110 may be communicated. Similarly, the media IP address may include an IP address of endpoint device 104 for receiving media packet communications from SBC 110. More specifically, the IP address may be used by SBC 110 for sending media packet data originating from endpoint device 116 when a call between the two endpoints is eventually established (see below). The receiving of the call setup signaling message is also depicted in FIG. 4. Specifically, FIG. 4 shows SBC 110 receiving a SIP INVITE message 401 containing "IPE1" (i.e., the aforementioned media IP address) of endpoint device 104.

In block 304, a pair of session-based IP addresses is created. In one embodiment, SBC 110 selects a pair of available IP addresses from a pool of available session-based IP addresses, to serve as virtual ports. More specifically, the two session-based IP addresses (e.g., N-IPE1 and N-IPE2 as shown in FIG. 4) will serve as ports of SBC 110 for redirect streams that are established to carry media packet data between endpoint device 104 and endpoint device 116 via SBC 110.

In block 306, a hop IP router for routing media communications is selected. In one embodiment, SBC 110 selects an appropriate media router to be used to ultimately establish a first call leg between endpoint 104 and SBC 110. In one embodiment, SBC 110 may comprise a routing table database 214 that includes a list of routers (and associated IP addresses) that may be selected to establish a media connection leg with endpoint device 104. For instance, media card 206 may select one of the media routers from routing table database 214 to communicate media packets in the first call leg. In one embodiment, routing table database 214 may include a separate media routing table(s), or a collection of media routing tables and signaling routing tables.

In block 308, a first route query/MAC address resolution is conducted for the first call leg. After receiving the call setup message, media card 206 initiates a procedure (prior to completion of the call setup signaling process) to determine if the routing device (e.g., a media router) selected in block 306 is available to communicate media and/or voice data between SBC 110 and the calling party endpoint 104. Notably, this process is conducted prior to the termination of call signaling session between endpoints 104 and 116. In one embodiment, media card 206 utilizes address resolution protocol (ARP) to determine the availability of selected media router 118 to facilitate the eventual communication of media packets in the first call leg established between endpoint device 104 and SBC 110. For example, SBC 110 may use ARP to find the MAC address of media router 118 if the IP address of the router 118 is known. In one embodiment, media card 206 obtains the selected media router's IP address from database 214 and utilizes ARP to perform a route lookup/MAC address resolution procedure for an IP packet characterized by a destination IP address of IPE1 (which is obtained from the INVITE message) and a source IP address of N-IPE1 (which is the temporary, session-based IP address, as described in block 304).

In block 310, a determination is made as to whether the first query/resolution performed in block 308 was successful. In one embodiment, media card 206 is able to determine that the selected media router 118 is available if media card 206 receives an ARP response message. Specifically, a router device that receives an ARP request from SBC 110 will respond with a response message if the IP address in the ARP request belongs to the receiving router device. If the router device with the selected IP address is not available or is not on the network (e.g., router device is unplugged, powered off, has failed/crashed, etc.), then the query resolution will fail and/or time-out (e.g., due to the ARP request expiring at SBC 110) and method 300 will proceed to block 326. Alternatively, if the route query/MAC address resolution procedure indicates that the router is available and/or active, then the query/resolution is successful and method 300 continues to block 312.

In block 312, a first redirect stream (R1) is created. In one embodiment, in response to a successful query/resolution pertaining to media router 118, the control plane on SBC 110 sends a message instructing the SBC's user plane to initiate a redirect procedure. In one embodiment, a redirect stream comprises a directional media stream setup based on IP:port associations (e.g., IP address to SBC port association). For example, redirect stream R1 (e.g., see arrow 403 in FIG. 4) may include an association between a network address translation (NAT) destination (e.g., N-IPE2:port) to a NAT source (e.g., N-IPE1:port) to the destination (e.g., IPE1:port). Notably, the NAT destination and source are on SBC 110 and are handled internally by performing network address translation. That is, the NAT destination and source can logically be viewed as forwarding media packets through SBC 110. Once the media traversing the NAT destination and source is translated, the media is then forwarded over the link to endpoint 104 via IP media address IPE1.

In one embodiment, SBC 110 uses N-IPE2 to receive media packets directed to endpoint device 104 from endpoint device 116. As mentioned above, this NAT source address includes a session-based IP address obtained from a "pool" of network address translation (NAT) IP addresses utilized by SBC 110. N-IPE1 will serve as an exit point and N-IPE2 will serve as an entry point of this first established redirect stream 403, which is transparent to the call parties. More specifically, in anticipation of establishing a call connection, SBC 110 creates redirect stream 403 to facilitate the transfer of media packets from endpoint device 116 to endpoint device 104 in a manner that makes it appear that the media packet is originating from SBC 110 itself. For instance, any media packet leaving the redirect stream towards endpoint device 104 will indicate N-IPE1 as a source address (i.e., not N-IPE2 or IPE2) and IPE1 as a destination address.

In block 314, an INVITE message is sent to a called endpoint. In one embodiment, after the first redirect stream (i.e., redirect stream R1 403) is established, SBC 110 attempts to establish a second leg of the call by initiating a SIP INVITE message containing the second session-based IP pinhole address (e.g., the aforementioned "N-IPE2"). Namely, the second INVITE message is sent to endpoint device 116 using the called party address obtained from the original INVITE message. For example, FIG. 4 shows SBC 110 sending a SIP INVITE message 402 containing "N-IPE2" to endpoint device 116.

In block 316, an acknowledgement message that includes the called endpoint media address is received. In one embodiment, upon receiving the INVITE message, endpoint device 116 generates a 200 OK message containing an IP address that serves as an acknowledgement that the INVITE message was received and indicates where SBC 110 may transmit or forward media packet communication intended for endpoint device 116. For example, FIG. 4 depicts endpoint device 116 transmitting a 200 OK message 404 that contains IPE2 to SBC 110. This message is then forwarded to endpoint device 104 as message 405 from SBC 110. However, message 405 contains the N-IPE1 address of SBC 110 instead of the media address of endpoint device 116.

In block 317, a hop IP router for routing media communications is selected. In one embodiment, SBC 110 selects an appropriate media router to be used to ultimately establish the second call leg between endpoint 116 and SBC 110. In one embodiment, media card 206 may select one of the media routers from routing table database 214 to communicate media packets in the second call leg.

In block 318, a second route query/MAC address resolution is conducted for a second call leg. After receiving the 200 OK message, SBC 110 may determine whether media packets can be sent to IPE2 via selected media router 120. In one embodiment, media card 206 utilizes ARP to determine the availability of selected media router 120 to facilitate the eventual communication of media packets in the second call leg established between endpoint device 116 and SBC 110. Media card 206 may obtain the selected media router's (i.e., router 120) IP address from database 214 and may utilize ARP to perform a route lookup/MAC address resolution procedure for an IP packet characterized by a destination IP address of IPE2 (which is obtained from the 200 OK message) and a source IP address of N-IPE2.

In block 320, a determination is made as to whether the second query/resolution (see block 318) was successful. In one embodiment, media card 206 is able to determine that the selected router device is available if media card 206 receives an ARP response message from the selected router device. If the router device with the selected IP address is not available or is not on the network (e.g., router device is unplugged, powered off, has failed/crashed, etc.), then the query resolution will fail or time-out, and method 300 proceeds to block 326. Alternatively, if the query/resolution is successful, then method 300 continues to block 322.

In block 322, a second redirect stream (R2) is created. For example, if router 120 is available for routing media (i.e., the ARP lookup is successful), then a second redirect procedure is initiated. In one embodiment, SBC 110 establishes another session-based stream (e.g., see arrow 406 in FIG. 4) wherein any media packets sent from endpoint device 104 (that are directed to endpoint device 116) are received at IP pinhole N-IPE1 and are permitted to be sent to endpoint device 116 via N-IPE2. Notably, media packets originating from endpoint device 104 and leaving SBC 110 will indicate IPE2 as a destination address and N-IPE2 as a source address.

In block 324, a call session is established via the redirect streams. In one embodiment, SBC 110 creates a media path using redirect streams R1 and R2. Although the media path is created after the signaling process is completed, SBC 110 has previously determined that media routers 118 and 120 are available to accommodate media packet traffic between endpoints 104 and 116.

Returning to block 310 (or block 320), if a determination is made that the query/resolution is unsuccessful, then method 300 proceeds to block 326. In block 326, the call is rejected an error message is returned. In the event a query/resolution process is unsuccessful (see blocks 308 and 320), method 300 proceeds to block 328 where SBC 110 terminates the call processing of the call and an error message is returned to access network 100. In one embodiment, the error message is directed to the network administrator of network 100. The network administrator may then take alternative measures to establish the desired call session.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining the availability of an Internet protocol (IP) media router during a call setup comprising:
   receiving, from a first endpoint device, a first call setup signaling message to initiate a call signaling process requesting to establish a call session with a second endpoint device;
   selecting a first media router to establish a first call leg of the call session;
   performing a route query and media access control (MAC) address resolution to determine if the first media router is available, wherein the route query and MAC address resolution are performed after the initiation and prior to the termination of the call signaling process between the first endpoint device and the second endpoint device; and
   if the first media router is determined to be available, creating a first redirect stream to communicate media packets received from the second endpoint device to the first endpoint device via the first call leg.

2. The method of claim 1 further comprising:
   sending a second call setup signaling message to second endpoint device;
   receiving, from the second endpoint device, a response message including an IP media address associated with the second endpoint device;
   selecting a second media router to establish a second call leg of the call session;
   performing a route query and MAC address resolution to determine if the second media router is available; and
   if the second media router is determined to be available, creating a second redirect stream to communicate media packets received from the first endpoint device to the second endpoint device via the second call leg.

3. The method of claim 2 wherein each of the first redirect stream and the second redirect stream is created prior to the end of the call signaling process between the first endpoint device and the second endpoint device.

4. The method of claim 1 wherein determining if the first media router is available includes:
   sending an address resolution protocol (ARP) message towards the first media router; and
   receiving an ARP response message from the first media router.

5. The method of claim 1 wherein receiving a first call setup message includes receiving a first session initiation protocol (SIP) INVITE message.

6. The method of claim 2 wherein receiving a second call setup message includes receiving a second session initiation protocol (SIP) INVITE message.

7. The method of claim 1 wherein selecting a first media router includes selecting the IP address associated with one of the plurality of media routers listed in a routing table database.

8. The method of claim 1 wherein performing a route query and MAC address resolution includes utilizing an address resolution protocol (ARP) to determine the availability of the first media router.

9. The method of claim 1 wherein creating a first redirect stream includes establishing a directional media stream setup based on IP:port associations.

10. A session border controller (SBC) for determining the availability of an Internet protocol (IP) media router during a call setup comprising:
    a network interface of the SBC for receiving, from a first endpoint device, a first call setup signaling message to initiate a call signaling process requesting to establish a call session with a second endpoint device; and
    a media card of the SBC for selecting a first media router to establish a first call leg of the call session, for performing a route query and media access control (MAC) address resolution to determine if the first media router is available, wherein the route query and MAC address resolution are performed after the initiation and prior to the termination of the call signaling process between the first endpoint device and the second endpoint device, and if the first media router is determined to be available, creating a first redirect stream to communicate media packets received from the second endpoint device to the first endpoint device via the first call leg.

11. The session border controller of claim 10 wherein the media card is further configured to:
    send a second call setup signaling message to the second endpoint device;
    receive, from the second endpoint device via the network interface, a response message including an IP media address associated with the second endpoint device;
    select a second media router to establish a second call leg of the call session;
    perform a route query and MAC address resolution to determine if the second media router is available; and
    if the second media router is determined to be available, create a second redirect stream to communicate media packets received from the first endpoint device to the second endpoint device via the second call leg.

12. The session border controller of claim 11 wherein each of the first redirect stream and the second redirect stream is created by the media card prior to the end of the call signaling process between the first endpoint device and the second endpoint device.

13. The session border controller of claim 10 wherein the media card is further configured to:
send an address resolution protocol (ARP) message towards the first media router; and
receive, via the network interface, an ARP response message from the first media router.

14. The session border controller of claim 10 wherein the network interface is further configured to receive a first session initiation protocol (SIP) INVITE message.

15. The session border controller of claim 11 wherein the network interface is further configured to receive a second session initiation protocol (SIP) INVITE message.

16. The session border controller of claim 10 wherein the media card is further configured to select the IP address associated with one of the plurality of media routers listed in a routing table database.

17. The session border controller of claim 10 wherein the media card is further configured to utilize an address resolution protocol (ARP) to determine the availability of the first media router.

18. The session border controller of claim 10 wherein the media card is further configured to establish a directional media stream setup based on IP:port associations.

19. A non-transitory computer readable medium having stored thereon computer executable instructions that when executed by a processor of a computer control the computer to perform steps comprising:
receiving, from a first endpoint device, a first call setup signaling message to initiate a call signaling process requesting to establish a call session with a second endpoint device;
selecting a first media router to establish a first call leg of the call session;
performing a route query and media access control (MAC) address resolution to determine if the first media router is available, wherein the route query and MAC address resolution are performed after the initiation and prior to the termination of the call signaling process between the first endpoint device and the second endpoint device; and
if the first media router is determined to be available, creating a first redirect stream to communicate media packets received from the second endpoint device to the first endpoint device via the first call leg.

20. The non-transitory computer readable medium of claim 19 further comprising:
sending a second call setup signaling message to the second endpoint device;
receiving, from the second endpoint device, a response message including an IP media address associated with the second endpoint device;
selecting a second media router to establish a second call leg of the call session;
performing a route query and MAC address resolution to determine if the second media router is available; and
if the second media router is determined to be available, creating a second redirect stream to communicate media packets received from the first endpoint device to the second endpoint device via the second call leg.

* * * * *